(12) United States Patent
Thorez et al.

(10) Patent No.: US 8,704,181 B2
(45) Date of Patent: Apr. 22, 2014

(54) DEVICE AND METHOD FOR DETECTING ICE DEPOSITED ON AN AIRCRAFT STRUCTURE

(75) Inventors: Manuel Thorez, Les Molieres (FR); Laurent Paszkiewicz, Clamart (FR)

(73) Assignee: Zodiac Aerotechnics, Plaisir (FR)

( * ) Notice: Subject to any disclaimer, the term of this patent is extended or adjusted under 35 U.S.C. 154(b) by 76 days.

(21) Appl. No.: 13/361,590

(22) Filed: Jan. 30, 2012

(65) Prior Publication Data
US 2012/0193477 A1 Aug. 2, 2012

(30) Foreign Application Priority Data

Jan. 31, 2011 (FR) ...................... 11 50697

(51) Int. Cl.
*G01J 5/02* (2006.01)
*B64D 15/20* (2006.01)

(52) U.S. Cl.
USPC .............. 250/339.11; 250/339.12; 250/341.8; 244/134 F

(58) Field of Classification Search
USPC ........................................ 250/339.11–339.12
See application file for complete search history.

(56) References Cited

U.S. PATENT DOCUMENTS

| | | | | |
|---|---|---|---|---|
| 3,116,395 A | * | 12/1963 | Byrne et al. | .................. 219/201 |
| 4,327,286 A | * | 4/1982 | Thoma | ....................... 250/231.1 |
| 4,808,824 A | * | 2/1989 | Sinnar | ...................... 250/339.11 |
| 5,500,530 A | * | 3/1996 | Gregoris | .................. 250/339.11 |
| 7,000,871 B2 | | 2/2006 | Barre et al. | |
| 2005/0103927 A1 | | 5/2005 | Barre et al. | |

FOREIGN PATENT DOCUMENTS

| | | |
|---|---|---|
| DE | 44 37 577 A1 | 4/1996 |
| FR | 2 764 382 A1 | 12/1998 |
| FR | 2 858 595 A1 | 2/2005 |

OTHER PUBLICATIONS

Preliminary Search Report for French Patent Application No. FR 1150697, dated Oct. 5, 2011.

* cited by examiner

*Primary Examiner* — David Porta
*Assistant Examiner* — Jeremy S Valentiner
(74) *Attorney, Agent, or Firm* — Patterson Thuente Pedersen, P.A.

(57) ABSTRACT

The invention relates to an ice detection device and method for detecting ice on an aircraft in flight. The device includes a transmitter which emits a first and a second radiation in the direction of a reflective surface, these two radiations respectively being within a first wavelength band and a second wavelength band; and a receiver which captures the reflected radiations. The transmitter and said receiver are fixed on an external surface of the aircraft. Then a computer determines the presence or absence of ice as a function of the intensity of the captured radiations. The reflective surface is located outside the boundary layer of the aircraft during flight and includes a heating/cooling device.

20 Claims, 7 Drawing Sheets

DEVICE AND METHOD FOR DETECTING ICE DEPOSITED ON AN AIRCRAFT STRUCTURE

RELATED APPLICATION

The present application claims priority to French Application No. 11 50697 filed Jan. 31, 2011, which is incorporated herein in its entirety by reference.

FIELD OF THE INVENTION

The invention relates to an ice detection device and method for aircraft.

BACKGROUND OF THE INVENTION

Ice detection systems have been used in many different applications. Patent DE 44 37 577 discloses an ice detection device placed under a road for automotive vehicles, to determine whether there is ice on the road. This device includes a transmitter which transmits a first radiation and a second radiation in the direction of a unit incorporated within the road; a receiver which captures the first radiation and the second radiation reflected by a reflective surface; said receiver delivers a first intensity representative of the first captured radiation and a second intensity representative of the second captured radiation; and a computer which determines the presence or absence of ice from the ratio of the first intensity and the second intensity. For example, when this ratio is positive, ice is considered to be on the road; when this ratio is negative, ice is considered not to be on the road.

Detecting ice on aircraft creates different challenges. U.S. Pat. No. 5,500,530 describes a detection device of the same type, but for detecting the presence of ice on an aircraft on the ground. This device detects ice on an aircraft on the ground and not on an aircraft in flight. When an aircraft is in flight, ice accretion does not occur in the same manner on the various parts of the aircraft because of the existence of higher pressure areas and the different speeds and directions of the winds around the aircraft. It is particularly important to detect the first appearance of ice on the wings of an aircraft in flight so that this ice can be removed, because ice accretion can cause the aircraft to stall due to the loss of lift. Such ice detection is easier when the aircraft is on the ground because the appearance of ice occurs more uniformly.

This detector does not detect the apparition of icing conditions anywhere on an aircraft during flight as well as during Taxi, Take off and Landing phases (TTL) at around 0° C. Local variations in pressure coefficients at certain places on the aircraft can cause drops in temperature and allow ice to accumulate on those areas only, without being detected.

SUMMARY OF THE INVENTION

An object of the invention is to detect ice anywhere on an aircraft during flight as well as Taxi, Take off and Landing phases (TTL) under all icing conditions, including at or near 0° C. Therefore an object of the invention is an ice detection device for aircraft, said device comprising:

at least one transmitter which emits a first radiation and a second radiation in the direction of a reflective surface, said first radiation and said second radiation respectively being within a first wavelength band and a second wavelength band;

a receiver which captures the first radiation and the second radiation reflected by said reflective surface; and a computer which determines the presence or absence of ice as a function of the intensity of the first radiation and the intensity of the second radiation captured;

wherein said transmitter and said receiver are designed to be attached to external surface of the aircraft, and wherein the detection device comprises:

a protuberance on which the reflective surface is placed, said reflective surface extending at an angle substantially between 20° and 90° relative to said external surface of the aircraft, said reflective surface being located outside the boundary layer of the aircraft during flight;

a heating/cooling device able to exchange heat with at least a portion of said reflective surface.

Advantageously, this device allows that the ice conditions are below the Ludlam limit and therefore allows guaranteeing the appearance of ice.

Advantageously, a reflective surface which is monitored remotely is cooled and not the whole detection device.

In particular embodiments of the invention, the detection device can comprise one or more of the following characteristics:

the heating/cooling device is able to successively heat and cool the reflective surface until ice respectively disappears and appears, and comprises a clock which measures the times between the appearance and the disappearance of ice; said computer being able to determine the severity of the icing conditions as a function of the measured times;

the first wavelength band is between 1.3 µm and 1.45 µm and the second wavelength band is between 1.5 µm and 1.7 µm, and said device comprises a heating/cooling device able to cool the reflective surface;

said first radiation has a wavelength substantially equal to 1.42 µm, said second radiation has a wavelength substantially equal to 1.55 µm, said protuberance has an aerodynamic shape and, preferably, a shape that is at least partially cylindrical, a shape that has a teardrop-shaped cross-section, a shape resembling a half-bean, or an ogive shape supported by a mast;

the heating/cooling device is able to exchange heat with at least an end portion of the protuberance, and said reflective surface is located on said end portion of the protuberance, said portion of the end is surrounded by a thermal gasket, and said reflective surface is surrounded by a thermal gasket.

Another object of the invention is an ice detection method for aircraft, said method being carried out by a detection device comprising a transmitter, a receiver, a computer, a heating/cooling device, and a clock; said method comprising the following steps:

emitting a first radiation and a second radiation in the direction of the reflective surface, with said first radiation and said second radiation respectively being within a first wavelength band and a second wavelength band;

receiving said first radiation and said second radiation reflected by said reflective surface; determining the absence or presence of ice on the reflective surface as a function of the intensity of the first reflected radiation and the intensity of the second reflected radiation, wherein said method additionally comprises the following steps:

a) cooling the reflective surface until the computer determines the presence of ice, and measuring the cooling time, b) heating the reflective surface until the computer determines the absence of ice, and measuring the heating time, c) repeating steps a) and b) a predetermined number of times, d) determining the severity of the icing conditions as a function of the cooling time measured during step a) and the heating time measured during step b).

In some embodiments, the detection method may comprise one or more of the following characteristics, separately or in combination:

the first wavelength band is between 1.3 μm and 1.45 μm and the second wavelength band is between 1.5 μm and 1.7 μm;

when the detection device comprises a thermometer, the method additionally comprises the following steps:

determining the Total Air Temperature (TAT) on the reflective surface, cooling the reflective surface when the total temperature is between −10° C. and +10° C., and preferably between −5° C. and +5° C.;

the method additionally comprises the following steps:

a) evaluating the ice thickness by measuring the contrast between the intensity of the first radiation received and the intensity of the second radiation received, b) repeating step a) after a predefined time, c) calculating the ice accretion speed, d) determining the severity of the ice conditions as a function of the accretion speed.

The invention also concerns an ice detection method for aircraft, said method being carried out by a detection device comprising a transmitter, a receiver, a computer, a heating/cooling device and a clock; said method comprising the following steps:

emitting a first radiation and a second radiation in the direction of the reflective surface, said first radiation and said second radiation respectively being within a first wavelength band and a second wavelength band;

receiving said first radiation and said second radiation reflected by said reflective surface;

wherein said method additionally comprises the following steps:

a) evaluating the ice thickness by measuring the contrast between the intensity of the first radiation received and the intensity of the second radiation received;

b) repeating step a) after a predefined time;

c) calculating the ice accretion speed;

d) determining the severity of the ice conditions as a function of the accretion speed.

In addition, the invention relates to an ice detection device for aircraft, said detection device comprising:

at least one transmitter which emits a first radiation and a second radiation in the direction of a reflective surface of the aircraft, said first radiation and said second radiation respectively being within a first wavelength band and a second wavelength band;

a receiver which captures the first radiation and the second radiation reflected by said reflective surface; and a computer which determines the presence or absence of ice as a function of the intensity of the first radiation and the intensity of the second radiation captured;

wherein the first wavelength band is between 1.3 μm and 1.45 μm and the second wavelength band is between 1.5 μm and 1.7 μm, and wherein said transmitter and said receiver are designed to be attached to an external surface of the aircraft, and wherein the detection device comprises:

a protuberance on which the sensing surface is placed, said reflective surface extending at an angle substantially between 20° and 90° relative to said external surface of the aircraft, said reflective surface being located outside the boundary layer of the aircraft during flight; and a heating/cooling device able to exchange heat with at least a portion of said reflective surface.

BRIEF DESCRIPTION OF THE DRAWINGS

The invention will be better understood by reading the following description, provided solely for illustrative purposes, and referring to the attached drawings in which.

DETAILED DESCRIPTION OF THE DRAWINGS

Figure 1:
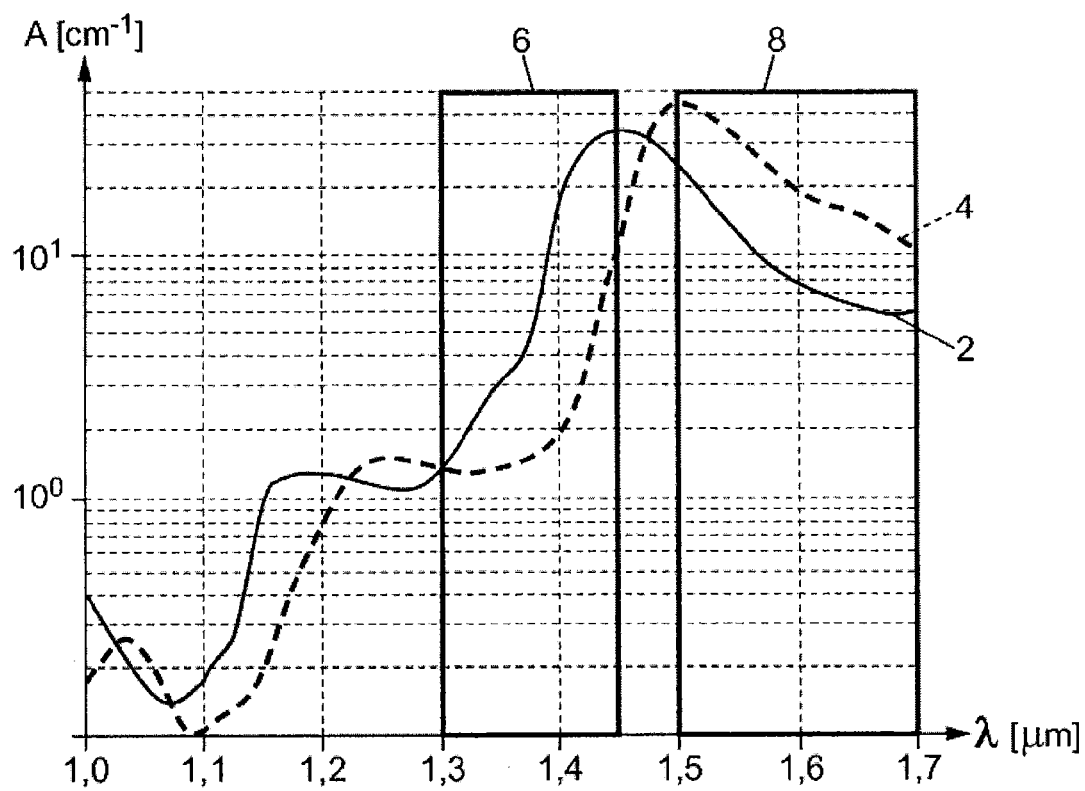
FIG. 1 is a graph representing the water and ice absorption coefficient as a function of the wavelength of an incident radiation.

As can be seen in FIG. 1, the present invention uses the principle in which the curve 2 for the absorption of radiation by water is greater than the curve 4 for the absorption of the same radiation by ice when the wavelength of the radiation is between 1.3 μm and 1.45 μm. Likewise, the curve 2 for the absorption of this same radiation by water is less than the curve 4 for the absorption of this same radiation by ice, when the wavelength of this radiation is between 1.5 and 1.7 μm.

Figure 2:
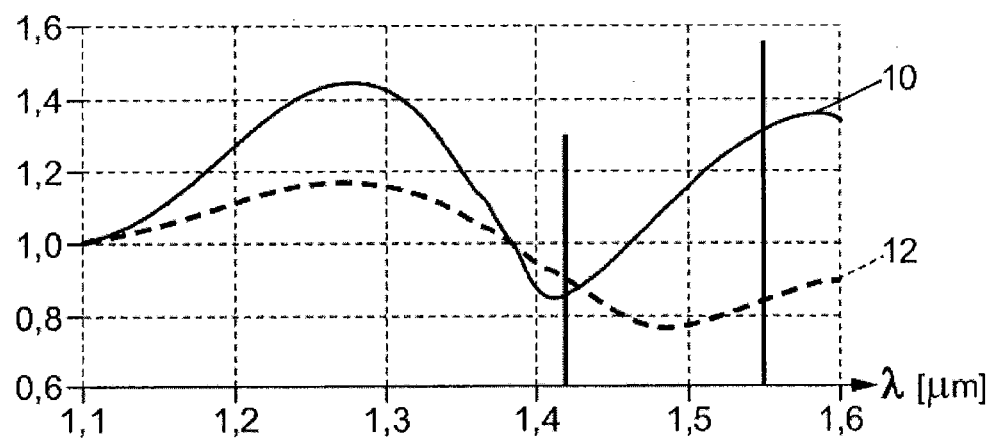
FIG. 2 is a graph representing the effective reflectance of an incident radiation on a wet and iced surface as a function of the wavelength of the incident radiation.

As a result, as can be seen in FIG. 2, the difference between the effective reflectance 10 by a wet aluminum surface is less for a radiation of a wavelength of around 1.42 μm than for a radiation of a wavelength of around 1.55 μm, while the effective reflectance 12 by this same aluminum surface when covered with ice, is slightly greater for a radiation of a wavelength of around 1.42 μm than for a radiation of a wavelength of around 1.55 μm. The effective reflectance, illustrated in FIG. 2, is defined here by the reflectance of a given material at a given wavelength divided by the reflectance of this material at a wavelength equal to 1.1 μm.

Figure 3:
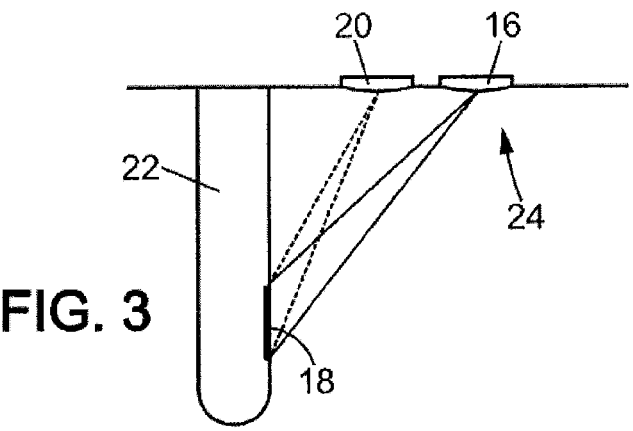
FIG. 3 is a schematic representation of part of the detection device of the invention.
Figure 4:
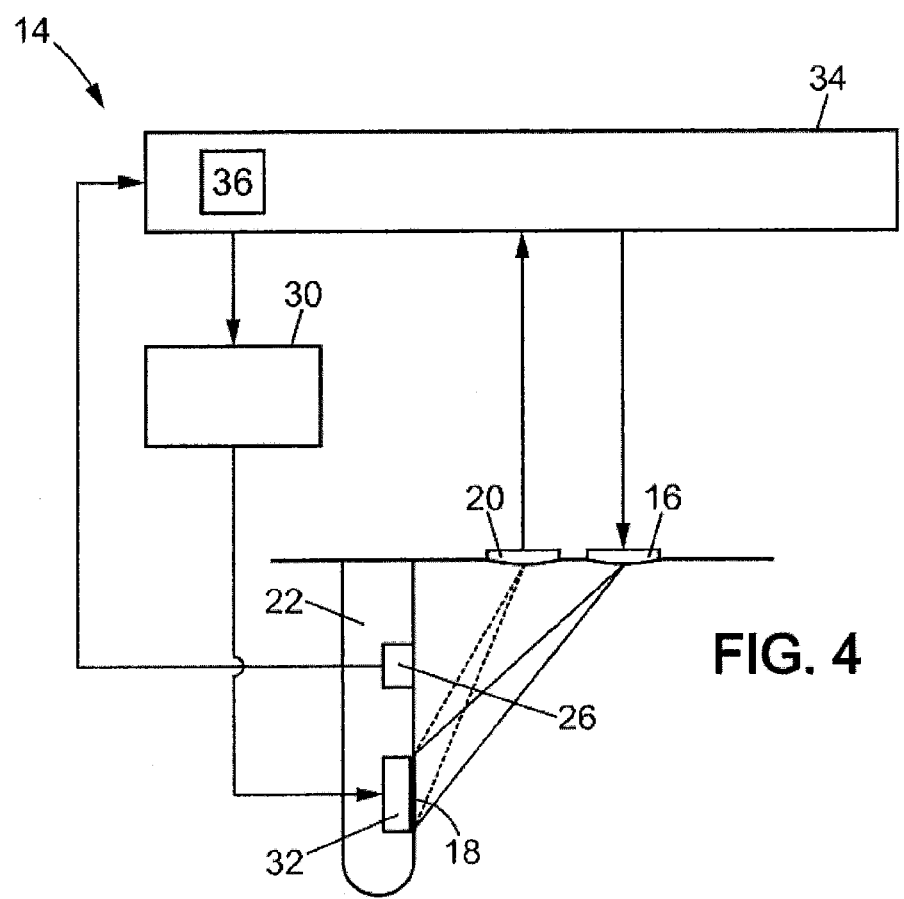
FIG. 4 is a schematic representation of the detection device of the invention.

With reference to FIG. 3, the detection device 14 of the invention can be attached to an external surface of an aircraft such as the wings, the stabilizers, the fuselage, or any other location specified by the aircraft manufacturer, to provide an in-flight ice detector. With reference to FIGS. 3 and 4, the detection device 14 of the invention comprises a transmitter 16 which emits a first radiation and a second radiation in the direction of a reflective surface 18, a protuberance 22 on which the reflective surface 18 is arranged, and a receiver 20 for capturing the first radiation and the second radiation reflected by the reflective surface 18.

The first radiation is within a first wavelength band and the second radiation is within a second wavelength band. As illustrated in FIG. 1, the first wavelength band 6 is between 1.3 µm and 1.45 µm, and the second wavelength band 8 is between 1.5 µm and 1.7 µm.

Preferably, the first radiation has a wavelength substantially equal to 1.42 µm. Preferably, the second radiation has a wavelength substantially equal to 1.55 µm.

In one embodiment of the invention, the detection device comprises a single transmitter and two bandpass filters. The transmitter 16 emits a radiation having a wavelength of between 1.1 µm and 1.7 µm. The two bandpass filters, placed upstream from the receiver 20, have passbands chosen to distinguish the first wavelength band 6 from the second wavelength band 8.

As a variant, the transmitter 16 comprises two transmission sources and one receiver 20 able to receive a radiation having a wavelength within the band ranging from 1.1 µm to 1.7 µm.

The transmitter 16 and the receiver 20 are adapted to be attached to an external surface 24 of the aircraft.

The protuberance 22, also called the probe, preferably has an aerodynamic profile such as the profiles defined by the NACA (National Advisory Committee for Aeronautics).

In the embodiment illustrated in FIGS. 3 and 4, the protuberance 22 is cylindrical in shape and extends perpendicularly to the external surface 24 of the aircraft so that the reflective surface 18 extend with an angle comprised between 90° with respect to the external surface 24 of the aircraft.

The reflective surface 18 is located outside the boundary layer when the aircraft is in flight, to allow the accretion of ice. In other words, the reflective surface 18 is disposed at a distance substantially greater than 30 mm away from the external surface 24 of the aircraft carrying the transmitter 16 and the receiver 20.

The detection device 14 additionally comprises a thermometer 26 able to measure the total air temperature (generally called the TAT), and a heating/cooling device 30 able to exchange heat with the reflective surface 18. The thermometer 26 is, for example, assembled onto or in the protuberance 22. The heating/cooling device 30 is also able to cool the reflective surface 18 in order to bring this surface well below the Ludlam limit and maintain it at a temperature less than any other part of the aircraft.

This Ludlam limit is a theoretical combination of a temperature value and a liquid water content at a given flow rate, indicating the proportion of supercooled liquid which will freeze upon contact with an object. Under operating conditions near this limit, in which the supercooled liquid does not freeze completely, ice may still accumulate at certain areas on the aircraft and not on the probe. Irregularities on the surface of the aircraft are also points where this inopportune icing phenomenon may occur, because of the local drop in temperature due to turbulence there. The heating/cooling device 30 is able to cool the reflective surface 18 under these conditions. The reflective surface 18 thus becomes the portion of the aircraft where ice accumulates first and is the last to remain.

In the embodiment of the invention illustrated in FIG. 4, the heating/cooling device 30 has a heat exchange surface 32, schematically represented by a rectangle, of dimensions substantially equal to the reflective surface 18. The heating/cooling device 30 is also able to heat the reflective surface 18, as described below in the detection method of the invention. Note that the noun "heat" as used in the present invention refers to any form of energy which is exchanged between a system and its environment when a temperature difference exists between them. This term therefore includes both the concepts of heating and cooling.

The heating/cooling device 30 consists, for example, of one or more Peltier modules and/or one or more heating resistors mounted outside the probe 22 for example in the fuselage of the aircraft. One or more heat pipes may, for example, be used to bring heat from the heating/cooling device 30 to the heat exchange surface 32. The heating and cooling of the heat exchange surface 32 may also occur locally, without using heat pipes to carry energy, by using one or more Peltier elements and/or one or more small heating resistors mounted inside the probe 22.

The detection device 14 additionally comprises a computer 34 for determining the absence or presence of ice on the detection surface 18 as a function of the intensity of the first radiation and the intensity of the second radiation captured by the receiver 20. For this purpose, the computer 34 is electrically connected to the transmitter 16 and to the receiver 20. The computer 34 is also able to control the heating/cooling device 30 so that said device heats or cools the reflective surface 18, possibly as a function of the total air temperature. For this purpose, the computer 34 is electrically connected to the heating/cooling device 30 and to the thermometer 26.

The computer 34 is able to determine the presence or absence of ice on the reflective surface 18 from the intensity of the first radiation and the intensity of the second radiation captured by the receiver 20. For this purpose, the computer 34 calculates the contrast C by using the following formula:

$$C = \frac{R_{\lambda 2} - R_{\lambda 1}}{R_{\lambda 2} + R_{\lambda 1}}$$

where:

$_{\lambda 1}R$ is the intensity of the first radiation captured by the receiver 20; and $_{\lambda 2}R$ is the intensity of the second radiation captured by the receiver 20.

Thus, the computer 34 is capable of computing a ratio between on one hand the difference between the first and the second intensities and on the other hand the sum of the first and the second intensities. Then, the computer 34 is adapted to determine the presence or absence of ice on the reflective surface according to this ratio.

Advantageously, the contrast C is defined as a ratio between a difference in intensities and a sum of intensities, such that this term is a relative term. Thus a partial dirtying of the reflective surface 18 or the lens of the receiver 20 does not prevent the detection of ice. The ice detection device and method therefore function as soon as a small portion of the intensity is received by the receiver 20.

The detection device 14 additionally comprises a clock 36 that measures a heating time and a cooling time for the reflective surface 18, as explained in the detection method described below.

As a variant, the heating/cooling device 30 comprises a heating unit, for example consisting of a resistor, and a cooling unit independent of the heating unit, for example consisting of the cold side of a Peltier thermo-electric module.

Advantageously, the detection method and device of the invention can operate by cooling the reflective surface 18, to guarantee detection under all icing conditions. In a degraded mode, the detection method and device of the invention can operate without cooling the reflective surface 18.

Figure 5:
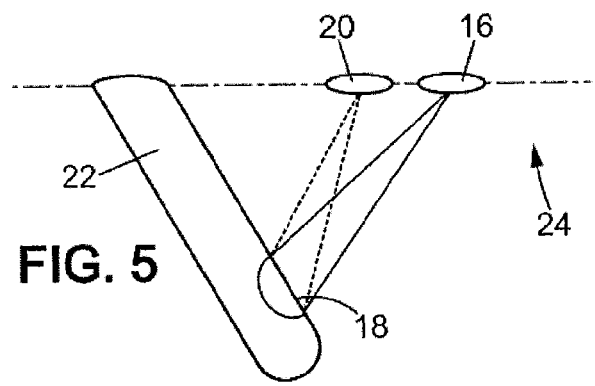
FIG. 5 is a schematic representation of second embodiment of part of the detection device of the invention.

With reference to FIG. 5, the detection device 14 according to the second embodiment of the invention is similar to the detection device 14 according to the first embodiment illustrated in FIGS. 3 and 4, aside from the fact that the reflective surface 18 disposed on the protuberance 22 extends at an angle of between 20° and 90° relative to the external surface 24 of the aircraft.

Figure 6:
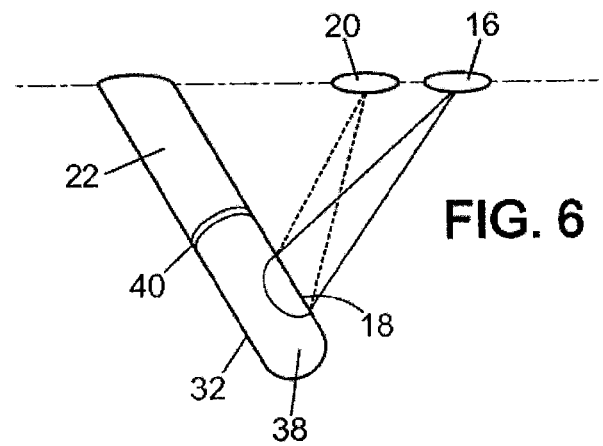
FIG. 6 is a schematic representation of third embodiment of part of the detection device of the invention.

With reference to FIG. 6, the detection device 14 according to the third embodiment of the invention is similar to the detection device 14 according to the second embodiment of the invention, aside from the fact that the heating/cooling device 30 is able to exchange heat with an end portion 38 of the protuberance 22. The heat exchange surface 32 is then located beneath the entire end portion 38 of the protuberance 22.

In the embodiment illustrated in FIG. 6, the end portion 38 consists of half of the protuberance 22. A thermal gasket 40, assembled onto the protuberance 22, isolates the end portion 38 from the rest of the protuberance 22. Thus, the thermal gasket 40 isolates the portion of the protuberance 22 to be heated or cooled from the rest of the protuberance 22. This thermal gasket can be made of rubber, ceramics or any other isolating material. It can also be constituted in the form of a thin wall of the same material than the two fittings to isolate one from the other.

Figure 7:
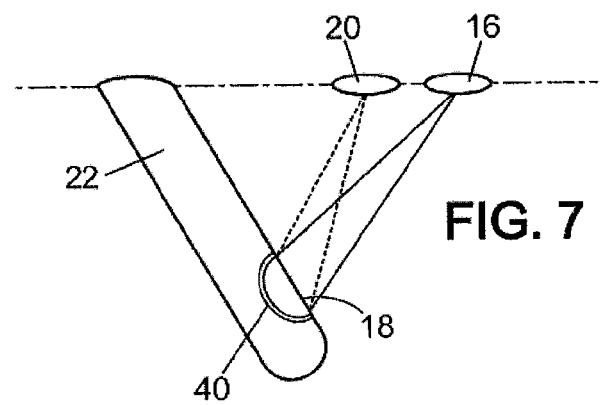
FIG. 7 is a schematic representation of fourth embodiment of part of the detection device of the invention.

With reference to FIG. 7, the detection device 14 according to a fourth embodiment of the invention is similar to the detection device 14 according to the second embodiment of the invention illustrated in FIG. 5, aside from the fact that here the thermal gasket 40 is placed around the periphery of the reflective surface 18.

Figure 8:
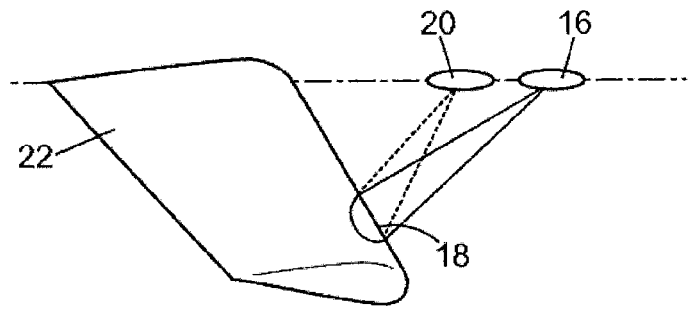
FIG. 8 is a schematic representation of fifth embodiment of part of the detection device of the invention.
Figure 9:
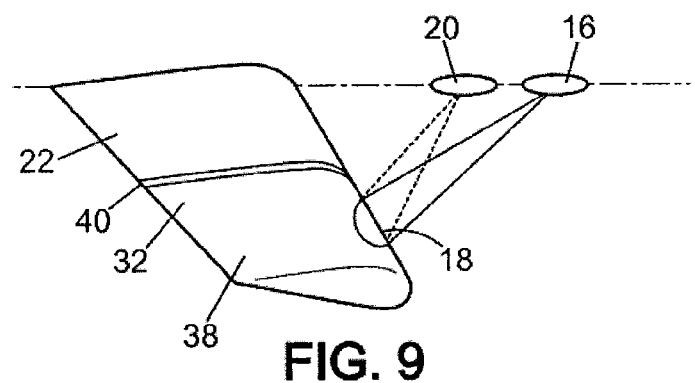
FIG. 9 is a schematic representation of sixth embodiment of part of the detection device of the invention.
Figure 10:
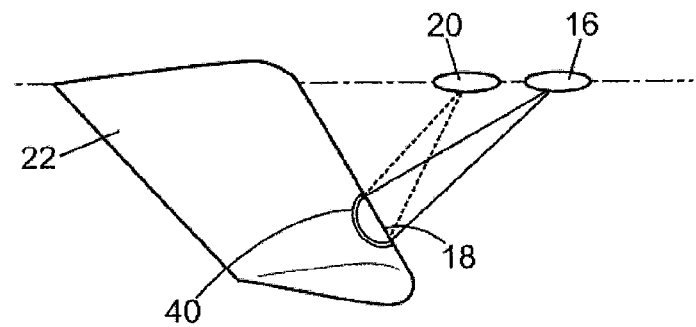
FIG. 10 is a schematic representation of seventh embodiment of part of the detection device of the invention.

With reference to FIGS. 8, 9 and 10, the detection device according to the fifth, sixth, and seventh embodiments of the invention are respectively similar to the detection device according to the second, third, and fourth embodiments of the invention, aside from the fact that the protuberance 22 is in the shape of a fin. In particular, the protuberance 22 has a cross-section in the shape of a teardrop. Advantageously, this shape improves the aerodynamic coefficient of the ice detection device.

Figure 11:
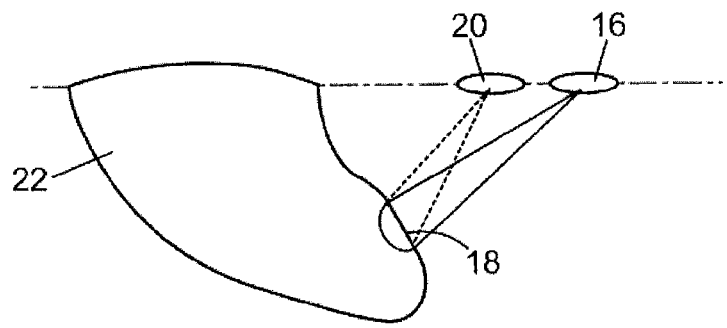
FIG. 11 is a schematic representation of eighth embodiment of part of the detection device of the invention.
Figure 12:
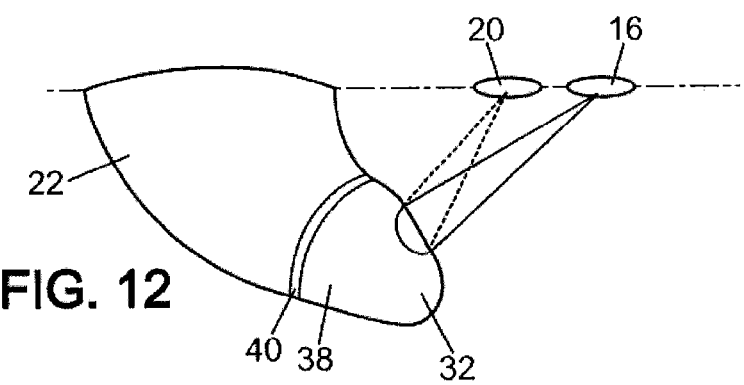
FIG. 12 is a schematic representation of ninth embodiment of part of the detection device of the invention.
Figure 13:
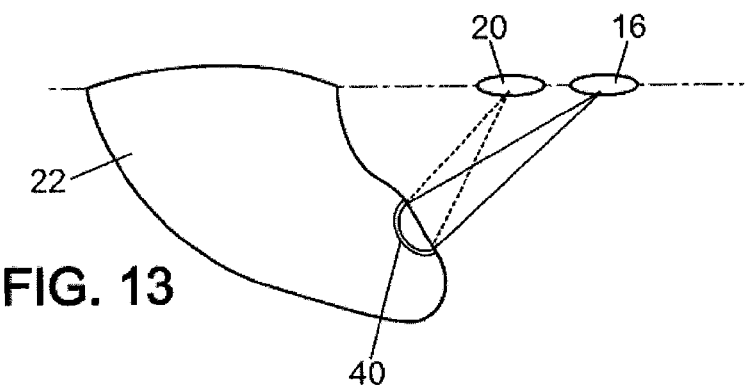
FIG. 13 is a schematic representation of tenth embodiment of part of the detection device of the invention.

The detection devices according to the eighth, ninth, and tenth embodiments of the invention, illustrated in FIGS. 11 to 13, are respectively similar to the detection device according to the second, third, and fourth embodiments of the invention, aside from the fact that here the protuberance 22 is in the shape of a half-bean, as can be seen in FIGS. 11 to 13.

Advantageously, this shape facilitates the melting of ice during deicing periods. A region of the protuberance 22 has a flat surface from which the radiation is reflected. This region forms the reflective surface 18. The end of the protuberance 22 has a rounded aerodynamic profile. The pointed base of the protuberance 22 breaks up the melting ice which is then carried away by the air flow.

Figure 14:
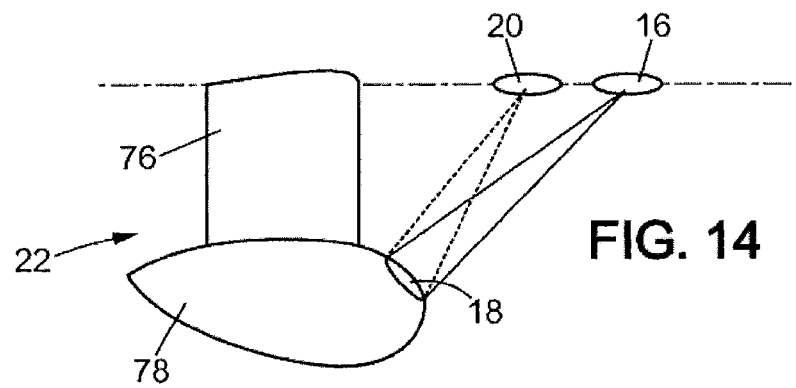
FIG. 14 is a schematic representation of eleventh embodiment of part of the detection device of the invention.
Figure 15:
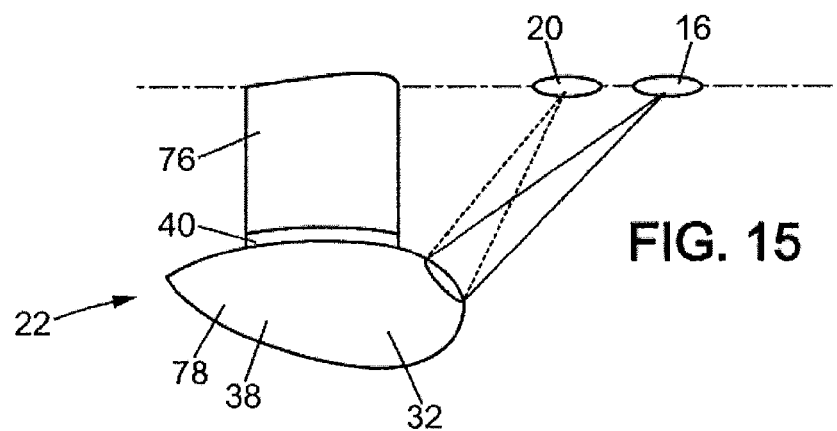
FIG. 15 is a schematic representation of twelveth embodiment of part of the detection device of the invention.
Figure 16:
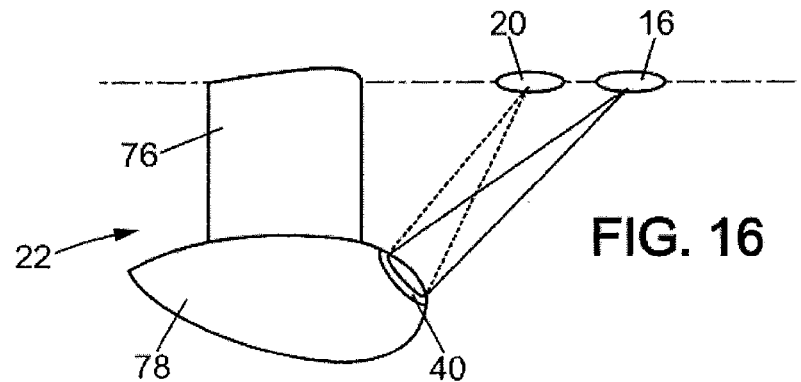
FIG. 16 is a schematic representation of thirteenth embodiment of part of the detection device of the invention.

The detection devices according to the eleventh, twelfth, and thirteenth embodiments of the invention, illustrated in FIGS. 14 to 16, are respectively similar to the detection device according to the second, third, and fourth embodiments of the invention, aside from the fact that the protuberance 22 consists of a mast 76 and an ogive 78 supported by the mast 76.

The ogive 78 has an aerodynamic shape, which longitudinal section can be a NACA profile as can be seen in FIGS. 14 to 16.

Advantageously, this ogive shape, which can be a NACA profile body of revolution, facilitates laminar flow while minimizing the drag that it causes. In this embodiment, the reflective surface 18 is flat.

In all the embodiments shown of the present invention, the reflective surface 18 extends with an angle between 20° and 90° with respect to the external surface of the aircraft 24, when the detection device according to the invention is attached to the aircraft.

Figure 17:
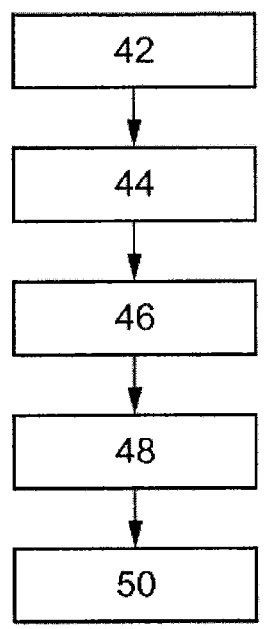
FIG. 17 is a diagram representing the steps in the detection method of the invention.

With reference to FIG. 17, the detection method of the invention begins with a step 42 in which the computer 34 orders the transmitter 16 to emit a first radiation in the direction of the reflective surface 18. This first radiation is within a first wavelength band of between 1.3 μm and 1.45 μm, illustrated in FIG. 1.

During a step 44, the receiver 20 receives the first radiation reflected by the reflective surface 18 and sends the received intensity to the computer 34. Step 44 is performed during step 42.

During a step 46, the transmitter 16 emits a second radiation in the direction of the reflective surface 18. This second radiation is within a second wavelength band of between 1.5 μm and 1.7 μm.

During a step 48, the receiver 20 receives the radiation reflected by the reflective surface 18, and sends it to the computer 34. Step 48 is performed during step 46.

During a step 50, the computer 34 determines whether or not ice is present on the reflective surface 18 by calculating the contrast C.

When the contrast C is less than a predetermined threshold, the computer 34 considers ice to be present on the reflective surface 18. Conversely, when the contrast C is greater than another predetermined threshold, the computer 34 considers the reflective surface 18 not to be covered with ice. These thresholds depend on the relative intensities of the emitted radiation.

When the computer 34 has detected the presence of ice, it is necessary to remove the ice from the protuberance 22 before restarting a detection cycle to find out whether the aircraft is still flying under icing conditions. For this purpose, the computer 34 orders the heating/cooling device 30 to heat the reflective surface 18. During this heating, the computer 34 continues to determine whether or not the reflective surface 18 is covered with ice. When the computer 34 determines that there is no longer any ice on the reflective surface 18, it orders the heating/cooling device 30 to stop heating the reflective surface 18.

Figure 18:
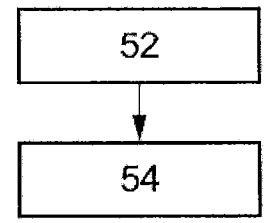
FIGS. 18, 19 and 20 are diagrams representing three modes of operation for the detection method of the invention.

With reference to FIG. 18, the detection method of the invention may additionally comprise a mode of operation in which, at around 0° C., the reflective surface 18 is maintained below the Ludlam limit.

In a first mode of operation, during a step 52, the total air temperature is measured by the thermometer 26.

Then, during a step 54, the computer 34 orders the heating/cooling device 30 to cool the reflective surface 18 in order to maintain the reflective surface 18 at several degrees below the measured temperature when it is close to 0° C.

As a variant, the temperature of the reflective surface is continually lowered by several degrees and is therefore not measured by the thermometer 26.

Figure 19:
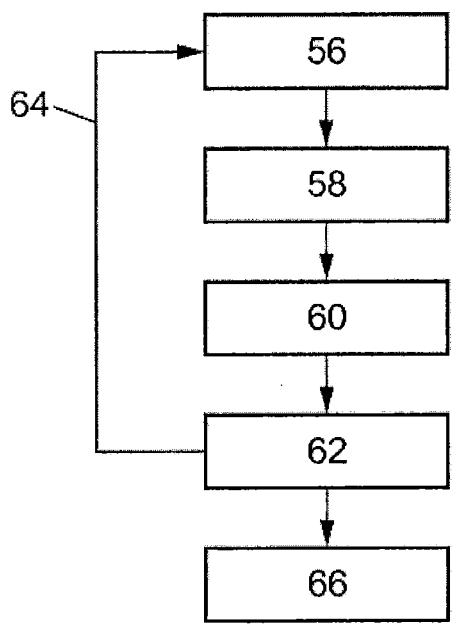

The detection method of the invention also allows measuring the severity of the icing conditions. For this purpose, with reference to FIG. 19, the method comprises a step 56 in which the heating/cooling device 30 cools the reflective surface 18 until the computer 34 determines the presence of ice using the method illustrated in FIG. 17.

During a step 58, the clock 36 measures the cooling time for the reflective surface 18.

During a step 60, which begins the moment the computer 34 determines the presence of ice, the computer 34 orders the heating/cooling device 30 to heat the reflective surface 18 and orders the clock 36 to measure the heating time. The heating step 60 continues until the computer 34 determines that ice is once again absent.

At that moment, during a step 62, the computer 34 determines the heating time by means of the clock 36.

During a step 64, the steps 56 to 62 are repeated. At each repetition of the steps 56 to 62, the cooling time and heating time measurements are refreshed.

During a step 66, the computer 34 determines the severity of the ice conditions as a function of the cooling time measured during step 58 and the heating time measured during step 62. The shorter the time, the more severe the icing.

The severity of the icing conditions may also be determined from the contrast C and from time information. The contrast C is reduced when water freezes and continues to decrease as the ice surface thickens. The variation of the contrast C over time reveals the ice accretion speed and therefore the severity of the icing conditions.

Figure 20:
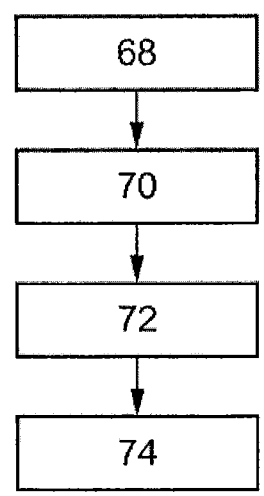

For this purpose, with reference to FIG. 20, the detection method of the invention comprises a step of evaluating 68 the thickness of the ice. This evaluation is done from a measurement of the contrast C between the intensity of the first radiation received by the receiver 20 and the intensity of the second radiation received by this receiver, and a comparison of the measured contrast C with a pre-established curve or table defining the thickness of the ice as a function of the contrast C.

During a step 70, the evaluation step 68 is repeated after a predetermined time.

During a step 72, the ice accretion rate is calculated from two pieces of ice thickness information, as well as the time measured between the evaluation steps for these ice thicknesses. This accretion rate can also be determined by evaluating the slope of the curve representing the evolution in the contrast C over time.

During a step 74, the severity of the ice conditions is determined as a function of the speed of accretion. For example, the degrees "light icing conditions," "moderate icing conditions," or "severe icing conditions" are evaluated by comparison of the calculated accretion rate with values from a pre-established table defining the degree of severity as a function of the accretion speed, or the slope of the curve representative of the evolution in the contrast C.

As a variant, the ice accretion speed is calculated from a larger number of ice thickness values. In this case, the method of the invention contains several steps of evaluating the ice thickness by contrast measurement. These evaluation steps are repeated a predetermined number of times at a predetermined rhythm. It is, for example, possible to capture such data ten times with one capture every 10 ms. The measurements are stopped after a predetermined number of captures or when a predefined maximum value is reached. In fact, when a certain maximum value is reached for the contrast, it no longer makes sense to measure the contrast. Then the slope of the reconstructed signal for the variation in the contrast C over time is calculated from different ice thickness measurement points. The severity of the icing conditions is then determined as a function of said slope.

Advantageously, the icing severity may be used to notify the pilot with an alarm when icing conditions are severe. The severity may, in addition, be used to progressively adjust the control of the deicing systems accordingly.

The present invention also relates to an aircraft equipped with an ice detection device as described above.

The invention claimed is:

1. An ice detection device for an aircraft, said detection device comprising:
    at least one transmitter which emits a first radiation and a second radiation in the direction of a reflective surface, said first radiation and said second radiation respectively being within a first wavelength band and a second wavelength band;
    a receiver which captures the first radiation and the second radiation reflected by said reflective surface; and
    a computer which determines the presence or absence of ice as a function of the intensity of the first radiation and the intensity of the second radiation captured; wherein said transmitter and said receiver are designed to be attached to an external surface of the aircraft, and wherein the detection device comprises:
    a protuberance on which the reflective surface is placed, said reflective surface extending at an angle substantially between 20.degree. and 90.degree. relative to the external surface of the aircraft, said reflective surface being located outside the boundary layer of the aircraft during flight; and
    a heating/cooling device able to exchange heat with at least a portion of said reflective surface and wherein said reflective surface is surrounded by a thermal gasket.

2. The ice detection device according to claim 1, wherein the heating/cooling device is able to successively heat and cool the reflective surface until the ice respectively disappears and appears, and wherein the ice detection device comprises a clock which can measure the time between the appearance and disappearance of ice; said computer being able to determine the severity of the icing conditions as a function of the measured times.

3. The ice detection device according to claim 1, wherein the first wavelength band is between 1.3 µm and 1.45 µm and the second wavelength band is between 1.5 µm and 1.7 µm.

4. The ice detection device according to claim 1, wherein said first radiation has a wavelength substantially equal to 1.42 µm.

5. The ice detection device according to claim 1, wherein said second radiation has a wavelength substantially equal to 1.55 µm.

6. The ice detection device according to claim 1, wherein said protuberance has an aerodynamic shape.

7. An ice detection method for an aircraft, wherein a detection device comprises a transmitter, a receiver, a computer, a heating/cooling device, and a clock; said method comprising the following steps:
    emitting a first radiation and a second radiation in the direction of a reflective surface, with said first radiation and said second radiation respectively being within a first wavelength band and a second wavelength band;
    receiving said first radiation and said second radiation reflected by said reflective surface;
    determining the absence or presence of ice on the reflective surface as a function of the intensity of the first reflected radiation and the intensity of the second reflected radiation, wherein said method additionally comprises the following steps:
    a) cooling the reflective surface until the presence of ice is determined, and measuring the cooling time;

b) heating the reflective surface until the absence of ice is determined, and measuring the heating time;

c) repeating steps a) and b) a predetermined number of times;

d) determining the severity of the ice conditions as a function of the cooling time measured during step a) and the heating time measured during step b); and further comprising the following steps:

e) evaluation of a first ice thickness by measuring the contrast between the intensity of the first radiation received and the intensity of the second radiation received;

f) after a time, evaluation of a second ice thickness by measuring the contrast between the intensity of the first radiation received and intensity of the second radiation received;

g) calculating the ice accretion speed according to the first ice thickness, the second ice thickness and the length of time between the evaluation of the first ice thickness and the evaluation of the second ice thickness; and h) determining the severity of the ice conditions as a function of the accretion speed.

8. The detection method according to claim 7, wherein the detection device comprises a thermometer, and said method additionally comprises the following steps:

measuring the Total Air Temperature on the reflective surface; and cooling the reflective surface when the total temperature is between −10.degree. C. and +10.degree. C., and preferably between −5.degree. C. and +5.degree. C.

9. The detection method according to claim 7, wherein the first wavelength band is between 1.3 µm and 1.45 µm and the second wavelength band is between 1.5 µm and 1.7 µm.

10. An ice detection method for an aircraft, using a detection device comprising a transmitter, a receiver, a computer, a heating/cooling device, and a clock; said method comprising the following steps:

emitting a first radiation and a second radiation in the direction of a reflective surface, said first radiation and said second radiation respectively being within a first wavelength band and a second wavelength band;

receiving said first radiation and said second radiation reflected by said reflective surface;

wherein said method additionally comprises the following steps:

a) measuring the contrast between the intensity of the first radiation received and the intensity of the second radiation received; said measuring step is repeated a predetermined number of times with a predetermined timing until it reaches a predetermined number of steps or a predefined maximum contrast value;

b) calculating the slope of the contrast signal reconstructed from the measurements, and c) determining the severity of icing conditions according to said slope.

11. An ice detection device for an aircraft, said detection device comprising:

at least one transmitter which emits a first radiation and a second radiation in the direction of a reflective surface of the aircraft, said first radiation and said second radiation respectively being within a first wavelength band and a second wavelength band;

a receiver which captures the first radiation and the second radiation reflected by said reflective surface;

a computer which determines the presence or absence of ice as a function of the intensity of the first radiation and the intensity of the second radiation captured; wherein said transmitter and said receiver are designed to be attached to an external surface of the aircraft, and wherein the detection device comprises:

a protuberance on which the reflective surface is placed, said reflective surface extending at an angle substantially between 20.degree. and 90.degree. relative to said external surface of the aircraft, said reflective surface being located outside the boundary layer of the aircraft during flight; and a heating/cooling device able to exchange heat with at least a portion of said reflective surface; the heating/cooling device exchanging heat with at least an end portion of the protuberance, and wherein said reflective surface is located on said end portion of the protuberance, said end portion being surrounded by a thermal gasket.

12. The ice detection device according to claim 11, wherein the heating/cooling device is able to successively heat and cool the reflective surface until the ice respectively disappears and appears, and wherein the ice detection device comprises a clock which can measure the time between the appearance and disappearance of ice; said computer being able to determine the severity of the icing conditions as a function of the measured times.

13. The ice detection device according to claim 11, wherein the first wavelength band is between 1.3 µm and 1.45 µm and the second wavelength band is between 1.5 µm and 1.7 µm.

14. The ice detection device according to claim 11, wherein it comprises a heating/cooling device able to cool the reflective surface.

15. The ice detection device according to claim 11, wherein said first radiation has a wavelength substantially equal to 1.42 µm.

16. The ice detection device according to claim 11, wherein said second radiation has a wavelength substantially equal to 1.55 µm.

17. The ice detection device according to claim 11, wherein said protuberance has an aerodynamic shape.

18. The ice detection device according to claim 11, wherein said protuberance has a shape that is at least partially cylindrical or a shape that has a teardrop-shaped cross-section or a shape resembling a half-bean, or an ogive shape supported by a mast.

19. The ice detection device according to claim 1, wherein said protuberance has a shape that is at least partially cylindrical or a shape that has a teardrop-shaped cross-section or a shape resembling a half-bean, or an ogive shape supported by a mast.

20. The detection method according to claim 7, wherein the length of time between the evaluation of the first ice thickness and the evaluation of the second ice thickness is predefined.

* * * * *